United States Patent [19]
Moscardini et al.

[11] Patent Number: 5,633,902
[45] Date of Patent: May 27, 1997

[54] METHOD AND APPARATUS FOR DISMANTLING FUEL STORAGE RACKS

[75] Inventors: Robert L. Moscardini, Allison Park; Christopher P. Srock; Peter F. Davin, both of Pittsburgh, all of Pa.

[73] Assignees: U.S. Tool & Die, Inc.; Crouse Enterprises, Inc., both of Pittsburgh, Pa.

[21] Appl. No.: 399,489

[22] Filed: Mar. 7, 1995

[51] Int. Cl.$^6$ ............................................. G21F 9/28
[52] U.S. Cl. .................... 376/260; 376/308; 83/185; 83/930; 30/105; 82/82
[58] Field of Search ...................... 376/260, 261, 376/272, 308, 310, 313; 83/930, 923, 185, 178; 30/103, 104, 105; 82/47, 82, 83, 88; 175/263; 29/282, 426.4, 723

[56] References Cited

U.S. PATENT DOCUMENTS

| | | | |
|---|---|---|---|
| 4,383,394 | 5/1983 | Qurnell et al. | 376/261 |
| 5,203,244 | 4/1993 | Guigon et al. | 376/260 |
| 5,239,564 | 8/1993 | Jacquier et al. | 376/260 |
| 5,263,062 | 11/1993 | Guigon et al. | 376/261 |

*Primary Examiner*—Daniel D. Wasil
*Attorney, Agent, or Firm*—Clifford A. Poff

[57] ABSTRACT

A metal cutting motor driven saw blade carried by a housing structure for anchoring inside the fuel storage cell forms part of apparatus that is used in method to reduce the volume of radiologically contaminated metal racks after use for storing nuclear fuel assemblies under water in a storage pool. The motor driven saw is supported by a linear bearing that can be displaced by an actuator laterally with respect to a housing structure which is provided with piston and cylinder assemblies on two adjacent side walls to serve as releasable anchors. The linear actuator presses the saw blade against a side wall of a fuel storage cell causing part of a blade segment to penetrate the side wall. Thereafter, a drive shaft supported by bearings in the housing structure is rotated to displace the motor driven saw about a radial path of travel for severing the remaining portions of the wall of the fuel cell. A segment of the fuel cell is freed from the welded construction of the storage racks whereupon the segment is subdivided by a crop saw, then crushed to reduce its requirement for storage space in a long term storage facility.

15 Claims, 6 Drawing Sheets

METHOD AND APPARATUS FOR DISMANTLING FUEL STORAGE RACKS

BACKGROUND OF THE INVENTION

1. Field of the Invention

This invention relates generally to the disposal of radiologically contaminated metallic components, and more specifically, to a method and apparatus for reducing the volume of radiologically contaminated metal racks used to store nuclear fuel assemblies.

2. Prior Art

In order to maintain optimal power generating capacity, the fuel used in nuclear reactors is periodically replaced with new fuel. The fuel that is removed from the reactor is highly radioactive, irradiated, and is referred to as "spent fuel". The spent fuel is placed into metal tubular cells usually rectangular tubes adjoined together to form a storage device that is referred to as a "spent fuel rack". Spent fuel racks are pre-positioned at the bottom of a deep pool of water located adjacent to the reactor, known as the "spent fuel pool". Spent fuel constitutes high level radioactive waste as that term is used in both a technical and a regulatory sense.

When most nuclear reactors were designed and built, it was assumed that spent nuclear fuel would be reprocessed. Based upon this assumption, nuclear reactor installations have historically been designed and constructed to accommodate temporary storage of spent fuel in the spent fuel pool. It was intended that the spent fuel temporarily stored in the spent fuel pool would periodically be removed for reprocessing thereby making space available to accommodate the ongoing discharge of spent fuel from the reactor. However, as the result of technical and political pressures within the United States, high level radioactive waste disposal and/or reprocessing capacity has never become commercially available. As a result, spent fuel pools that were originally designed only for the temporary storage of spent fuel are now being used for long term, indefinite storage.

The spent fuel stored within these racks occurs after the racks have been pre-positioned at the bottom of a deep pool of water that is located immediately adjacent to the nuclear reactor. The racks become highly contaminated because they are in physical contact with irradiated spent fuel and because contaminated pool water permeates the surface area of the metal of the racks. In order to maximize the storage capacity of pools, operators of nuclear reactors have replaced the racks with newer ones having updated space efficient designs. Following replacement, the old racks must be disposed as low level radioactive waste. Both federal law and economic prudence dictate that the volume of the racks be reduced prior to disposal, storage, or beneficial reuse.

When old spent fuel racks are removed from the spent fuel pool, disposal or disposition of contaminated spent fuel racks is both technically difficult, and very costly. Because the racks are in physical contact with spent fuel and contaminated pool water, surface radioactive contamination levels are typically high when compared to other forms of metallic low level radioactive waste. Depending on the number of racks being replaced, there can be tens or hundreds of thousands of pounds of material requiring disposition.

It is known prior art to segment the racks using oxyacetylene or plasma arc cutting techniques. Torch cutting of contaminated spent fuel racks is extremely problematical for several reasons. Torch cutting yields dense concentrations of smoke that is heavily ladened with radioactivity and other potentially toxic gases, and particulate materials. Filtering the smoke, particulate, and vapors to levels that meet regulatorily mandated levels for worker safety is extremely difficult and costly. Smoke and particulate quickly clogs filtration systems thereby jeopardizing worker safety and the environment. Even with effective ventilation, workers are exposed to high concentrations of airborne radioactivity and other potentially toxic substances. Additionally, while using torches, workers must be in extremely close proximity to the racks, including the lower portions of the racks were radiation levels are the highest. As a result of working in such close proximity to the racks, radiation exposure to workers is high.

It is an object of the present invention to dismantle and remove tube sections safely and efficiently from a rack assembly used to store waste nuclear fuel assemblies incident to reducing the volume of contaminated material that must eventually be stored or processed, while simultaneously minimizing the radiological exposure of the operating personnel.

It is a further object of the present invention to provide a method and apparatus to dismantle a storage rack used to store nuclear fuel assemblies by dismembering the storage rack of individual storage cells and if desired further subdivide and crush the dismembered cell section to effect volume reduction through a shape change from tubular configuration to a generally plate-like configuration.

It is another object of the present invention to provide a method and apparatus for the volume reduction of irradiated nuclear fuel storage rack that is fabricated from tube or pipe structures, generally weldments by nature and typically consist of metal such as stainless steel or aluminum materials. These structures usually have limited access from their exteriors due to the cross-sectional dimensions of the storage rack. The reduction in volume of the nuclear fuel storage rack is to occur by the systematic mechanical dismantling of the structure from inside of the tubular storage cells.

It is a still further object of the present invention to mechanically cut spent fuel racks fabricated from tubes which can be round or square forming fuel storage cells that are attached to a base plate and welded together at the lead-in ends of the cells. This mechanical dismantling of the spent fuel rack is to occur by inserting an abrading or cutting apparatus into the hollow of a selected spent fuel cell to sever the cell wall generally at as each of its opposite ends from a weldment type fabricated unit including a base and a lead-in end of the storage rack.

SUMMARY OF THE INVENTION

More particularly according to the present invention there is provided a method for dismantling a storage rack used to store nuclear fuel assemblies, the storage rack including a base joined to an array of storage cells having fuel entry ends which are opposite to the base for a fuel assembly, the method including the steps of, pressing a metal cutting saw blade against an interior wall of a selected one of the storage cells at a site spaced from the base, moving the metal cutting saw blade in a direction outwardly from the interior of the tube to cause the saw blade to initially puncture and extend partly through the selected storage cell, and thereafter shifting the metal cutting saw blade about a cutting path from the puncture site within a storage cell generally transverse to the length of the storage cell to cut the remaining portion of the selected storage cell wall from the base.

According to another aspect of the present invention there is provided an apparatus for dismantling racks used to store nuclear fuel assemblies, the storage rack including a base joined to an array of tubular storage cells having fuel entry ends which are opposite to the base for a fuel assembly, the apparatus including a combination of, a support housing including means to rotatably support a drive shaft, the drive shaft having driven and drive shaft portions extending from opposite ends of the support housing, means for anchoring the support housing within the tubular configuration of a selected one of the tubular storage cells, a carrier supported by the driven shaft portion of the drive shaft, a metal cutting saw including a cutter blade rotatably driven at one end of a motor housing, means for supporting the motor housing on the carrier for displacement of the motor housing transverse to the rotational axis of the drive shaft for causing the saw blade to penetrate a wall portion of such a tubular storage cell and means for rotating the drive shaft for shifting the metal cutting saw blade from the puncture site about the storage cell cutting path generally transverse to the length of the storage cell to cut the remaining portion of the selected storage cell wall from the base. Preferably, the storage rack is arranged on horizontal supports such that the extended length of the cells is horizontal to facilitate handling of cell sections when freed by saw cutting operations from the remainder of the storage rack.

BRIEF DESCRIPTION OF THE DRAWINGS

These features and advantages of the present invention as well as other will be more fully understood when the following description is read in light of the accompanying drawings in which.

DETAILED DESCRIPTION OF THE DRAWINGS

Figure 1:
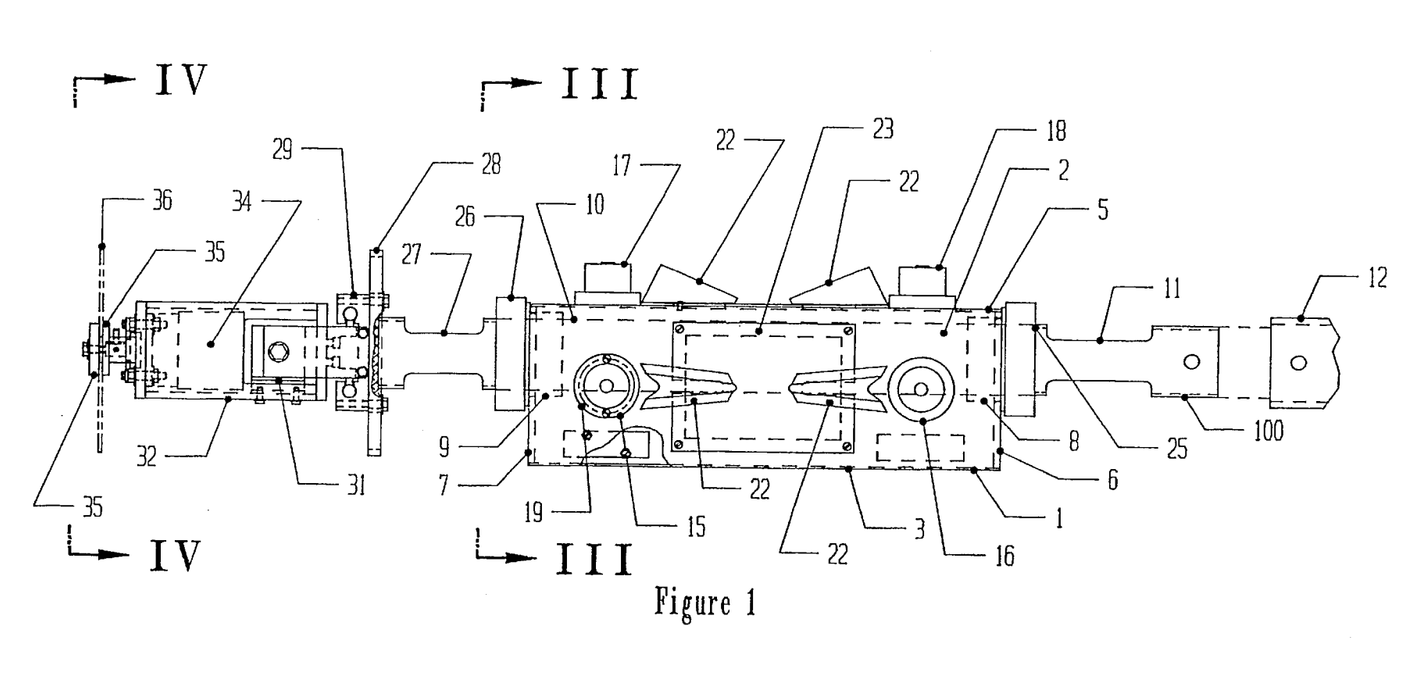
FIG. 1 is a plan sectional view of a preferred form of apparatus according to the present invention which is also used to carry out the method of the present invention.
Figure 2:
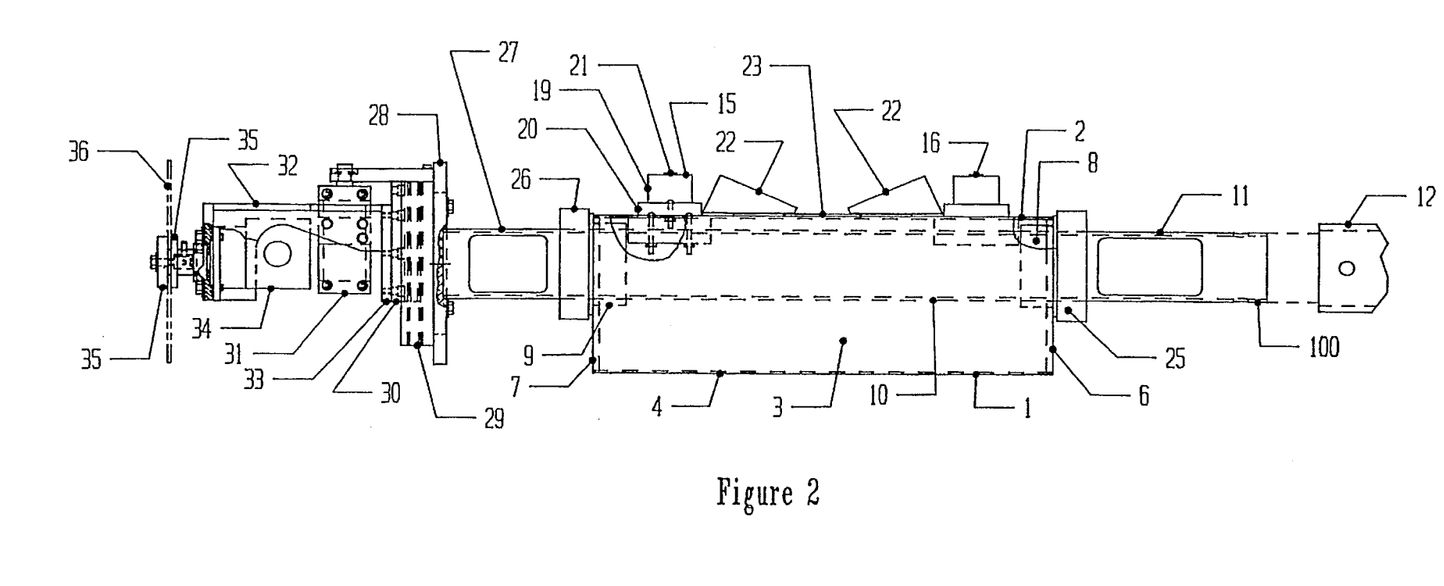
FIG. 2 is a side sectional view of the apparatus shown in FIG. 1.
Figure 3:
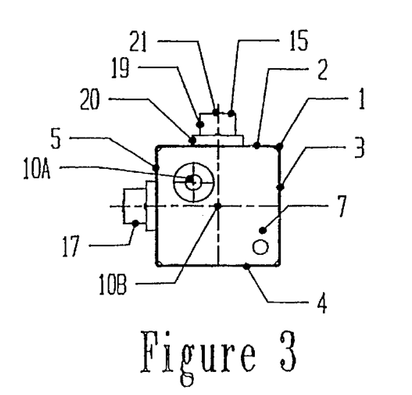
FIG. 3 is a front elevational view in section taken along lines III—III of FIG. 1.
Figure 4:
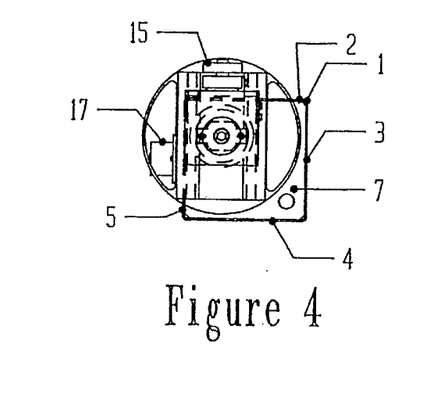
FIG. 4 is a front elevational view taken along lines IV—IV of FIG. 1.

FIGS. 1–3 illustrate the preferred form of a cutter apparatus 100 of the present invention for dismantling a storage rack after use for storing nuclear fuel assemblies. The storage rack and its use in a spent fuel pool will be described in greater detail hereinafter. The storage rack essentially is made up of an array of elongated storage cells which are tubular and can be of a circular, square or rectangular cross-section. The apparatus embodies a special construction to enable placement and operation at a required site within a given storage cell for severing the wall of the storage cell generally at each of its opposite ends. It is necessary to sever the end portions from their welded interconnection occurring both at the base of the fuel rack and at the fuel entry end of the storage cells.

The apparatus includes a support housing 1 having an internal cavity surrounded by side walls 2, 3, 4, and 5 and end walls 6 and 7. The end walls each support bearing sleeves 8 and 9 that in turn rotatably support a drive shaft 10. The drive shaft has a driven end portion 11 which can be mechanically connected to a crank arm 12. The crank arm is provided with a radially extending bar by which a workman or machine tool can apply torque to the drive shaft it to rotate about its longitudinal central axis 10A. As can be seen from FIG. 3, axis 10A extends along the housing 1 within an upper left quadrant with respect to the geometrical center 10B of housing 1. The location of axis 10A with respect to housing 1 is chosen such that the axis will coincide with a central longitudinal axis of a fuel storage cell when the housing is anchored at a desired site to perform a wall severing operation. The housing is anchored at this site by means of pneumatically powered clamp assemblies 15 and 16 supported by wall 3 and pneumatically powered clamp assemblies 17 and 18 supported by wall 4. Each of the pneumatically powered clamp assemblies includes a cylinder wall 19 affixed by a support base 20 to the housing wall and a piston 21 which can move to and fro along the internal wall of cylinder wall 19 in response to the application of pressurized air at opposite sides of a piston through suitable ducts. The ducts are joined by flexible conduits that extend external of the housing within a protective cavity formed by shields 22 which are shown in FIGS. 1 and 2. The shields at each side of the housing are mounted on a mounting plate 23 provided with a suitable opening to allow passage of the conduits into the interior of housing 1. The conduits as well as other power supply lines for a motor given saw blade extend from the end wall 6 of the housing to a suitable control panel having valving and having a supply of pneumatic pressure for controlling the operation of the pneumatically powered clamp assemblies 15–18.

The drive output end of shaft 10 is joined to a collar 25 which together with collar 26 at the opposite end of housing 21 prevents shifting of the drive shaft within the housing. Projecting from collar 25 is a drive output shaft 27 having secured to its projected end a L-shaped carrier 28. One leg of the carrier is secured to the drive output shaft 27 and carries a base portion 29 of a linear bearing 30. The second leg of the carrier supports an actuator 31 while operatively connected to a motor bracket 32 that is supported by the moveable member 33 of the linear bearing 30. Motor bracket 32 carries a drive motor 34. The drive motor has a drive output shaft to which there is affixed by mounting collars 35 a metal cutting saw blade 36 of a type per se well known in the art. Supply lines for fluid power to operate the linear actuator 31 and a line for power to operate drive motor 34 extend from carrier 28 through a suitable opening in end wall 7 of housing 1 where these lines are protected and thence formed as part of a bundle with the air supply lines for actuators 15–18 extending exteriorly of the storage cell.

Figure 5:
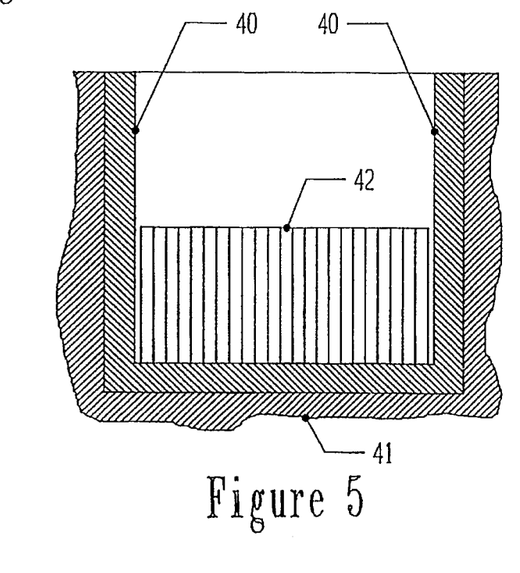
FIG. 5 is an elevational view in section of a spent fuel pool showing a spent fuel rack operatively arranged therein.
Figure 6:
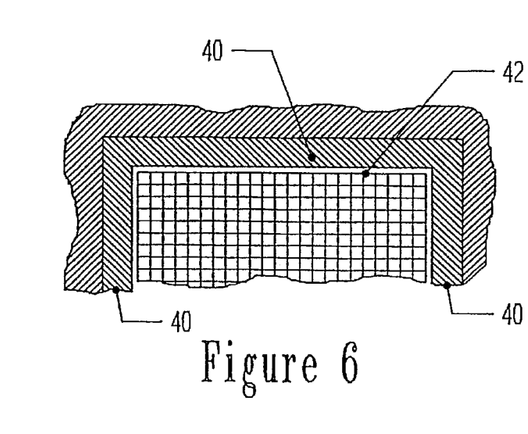
FIG. 6 is a partial plan view of the spent fuel pool shown in FIG. 5.

FIG. 5 and 6 illustrate a typical spent fuel pool that is formed within an excavated area by side walls 40 and floor wall 41 usually made of reinforced concrete. The water depth above a storage rack 42 is sufficient to always maintain a protective water barrier to function a moderator against harmful emissions from the stored nuclear fuel even when fuel assemblies are manipulated within the spent fuel pool from storage cell to storage cell. The storage rack 42 embodying a construction per se well known in the art is supported on the floor wall during actual use for supporting nuclear fuel assemblies. The rack essentially consists of tubular storage cells that are joined together to form an array as best shown in FIG. 6. The storage racks which are to be dismantled may take any of the diverse forms of construction but essentially the racks include fuel storage cells of an elongated tubular shape that is round, square or rectangular in cross section.

Figure 7:
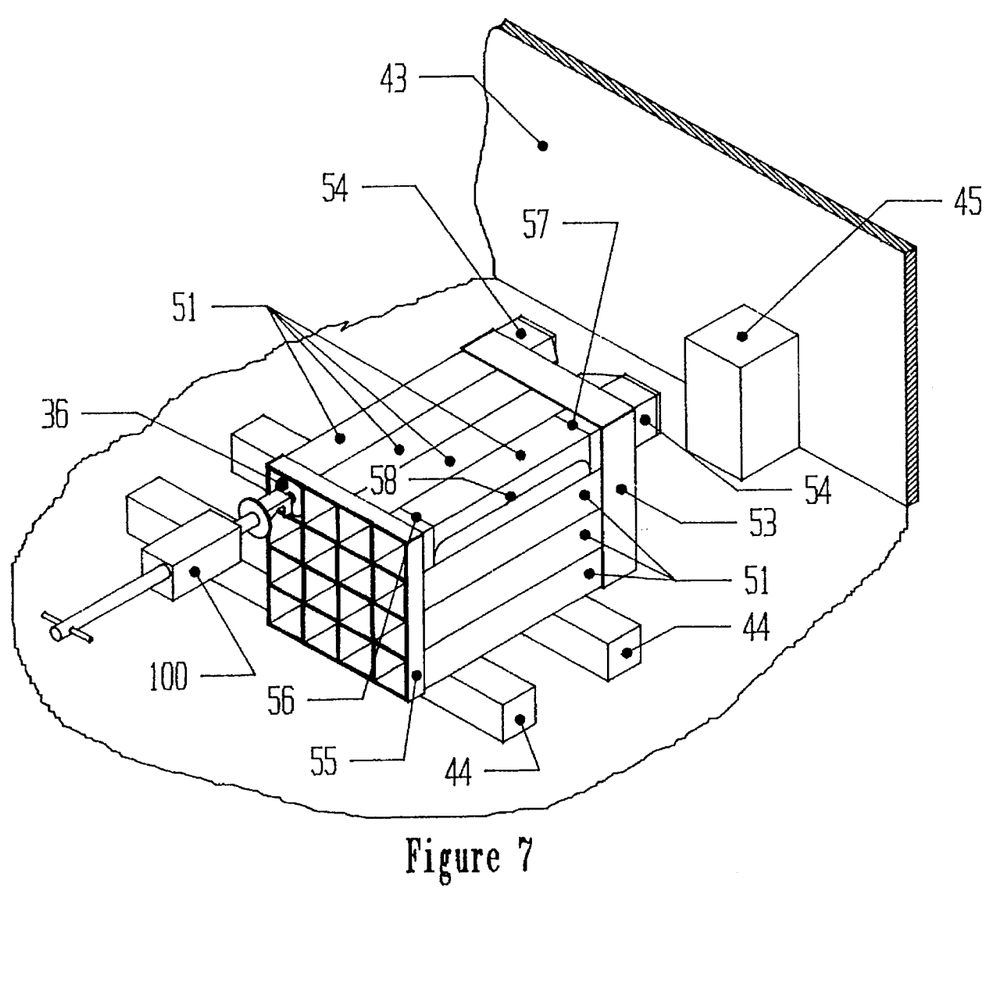
FIG. 7 is an isometric illustration of a work area enclosed by a tent for dismantling a fuel storage rack.

The cutter apparatus as described herein before and shown in FIGS. 1–4 is constructed to allow the apparatus to be passed along the length of the storage cell as can be best seen as in FIG. 7. It to be understood, however, that before the cutter apparatus is passed into a storage cell, the storage rack is first removed from its supporting relation on the floor of the spent fuel pool and placed into a confined area where an enclosed working environment is formed by erection of a tent 43 forming an enclosure about the rack and a suitable work area. There is schematically shown in FIG. 7 only a part of the side wall for the tent 43 which extends in a sealed fashion to the floor of the work area where there is also located support bases 44 on which a storage rack is supported by arranging the rack so that the side walls of the storage cell rest on the bases. In this orientation the extended lengths of the storage cells are horizontal not vertical as when used in the spent fuel pool. The volume enclosed in the tent 43 is treated by circulation through a HEPA filtration unit 45 to minimize radiological effects to the operating personnel and prevent emission of radioactive particulates to the environment. The present invention eliminates the need for a large steel building with a substantial bank of large HEPA filter units to compensate for torch cutting effects.

Figure 8:
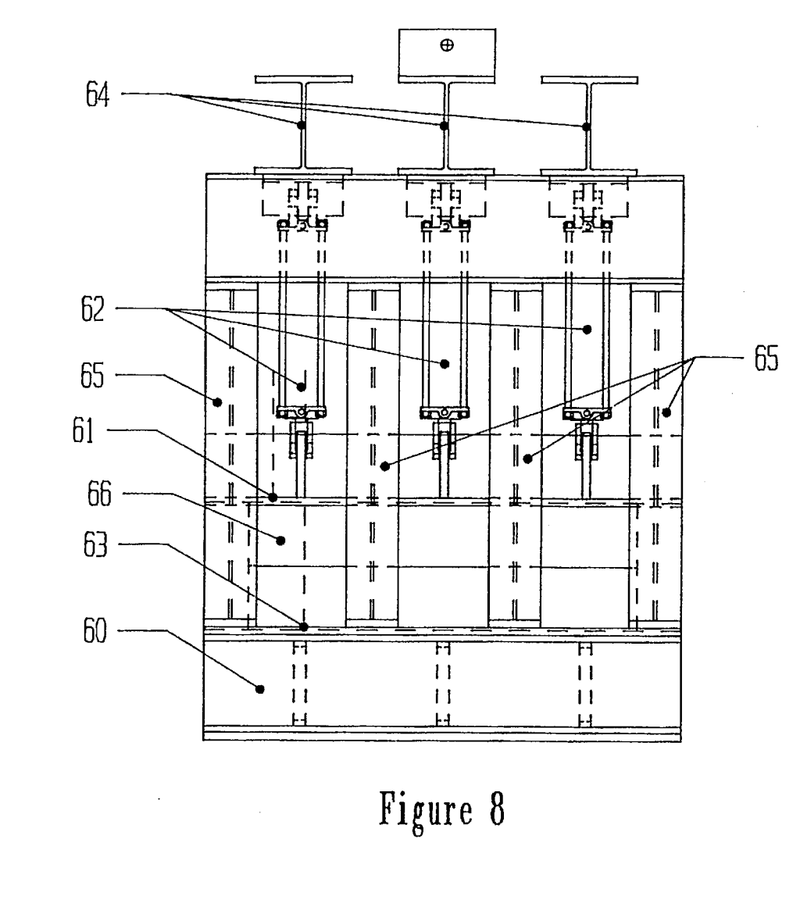
FIG. 8 is a side elevational view of a press for performing volume reductions to a segmented part of a fuel storage cell.
Figure 9:
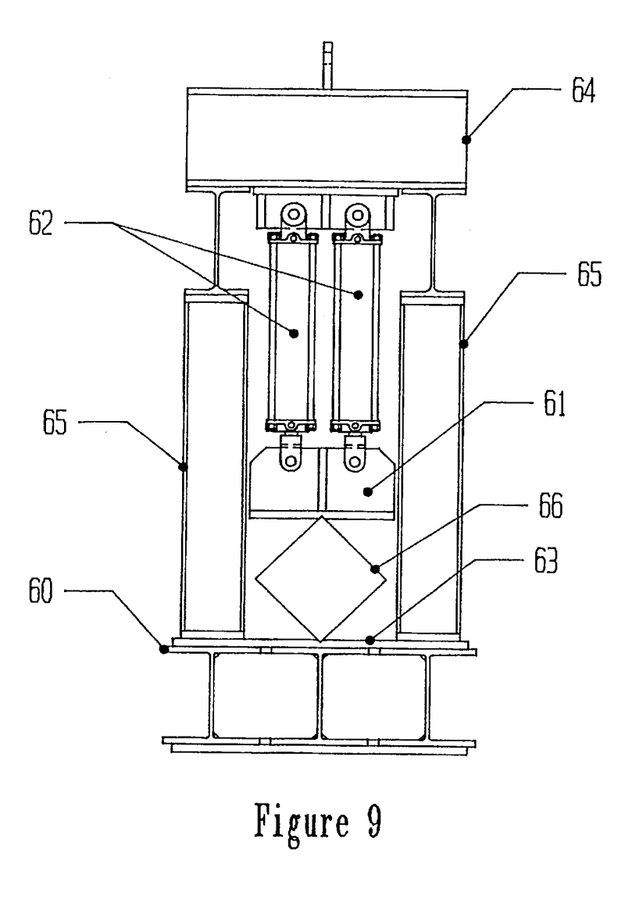
FIG. 9 is an end elevational view of the press shown in FIG. 8.
Figure 10:
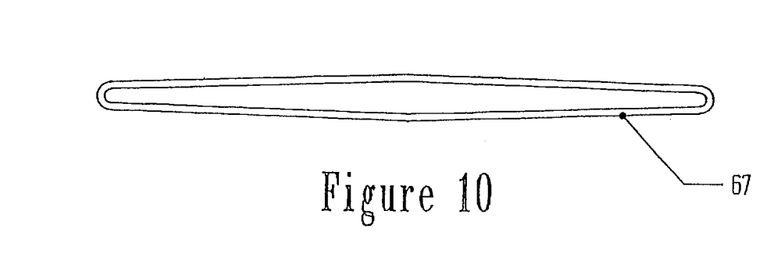
FIG. 10 is an enlarged end view of a segmented part of a fuel storage cell after volume reduction in a press shown in FIGS. 8 and 9.

In FIG. 7 the spent fuel storage rack has become contaminated because of the storing of radioactive fuel assemblies formerly used in a nuclear reactor. The spent fuel storage rack is a weldment type fabrication made up of an array of elongated storage cells shown in FIG. 7 in the form of tubes 51 having a square cross-sectional configuration. The storage cells may have a rectangular or a circular cross-sectional configuration. The rack 42 further includes a base 53 which encircles the lower most ends with the storage tubes 51 and is provided with support legs 54 by which the rack is supported on the floor on the spent fuel pool. At the top end of the rack, when located in its usual fuel storage position, there is located at the fuel entry ends of the tubes 51, a band 55 that encircles the storage tubes at the lead-in ends. After using cutter apparatus 100 saw cutting at 56–57 to free a selected one of the storage tubes from the base 53 and the band 55 there is formed a tube section 58 usually of a length of 8 feet or greater that can be subdivided and compacted for disposal. A jib crane can be used to transport the tube section to a sawing device such as a crop saw where the subdivided tube section is subdivided into lengths of preferably of 3 to 4 feet after which the tube sections can be processed in a press 60 shown in FIGS. 8 and 9. The press 60 has a movable platen 61 by means of a hydraulic piston and cylinder assemblies 62 displace the platen toward a stationary platen 63 between which the tube section resides. The cylinder assemblies 62 are supported by a cross heads 64 and joined by machine columns 65 to develop the necessary force to crush the tube section 66 which is oriented in the press on a corner edge so that after crushing a plate like residue 67 is formed as typically illustrated in FIG. 10. The plate-like residue has been reduced to a volume requiring a minimum of space for storage.

Figure 11:
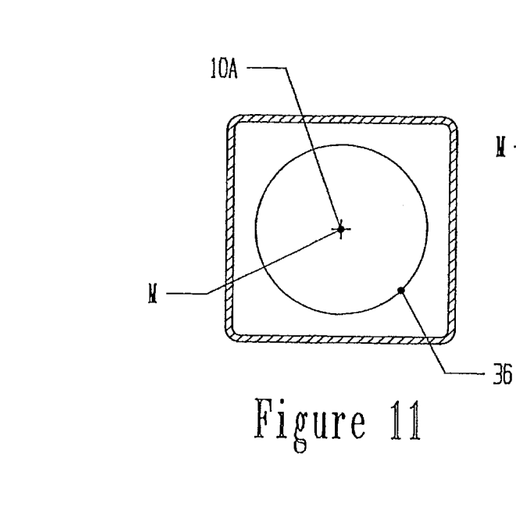
FIGS. 11–14 are sequential illustrations showing the penetration of a saw blade through a side wall part of a fuel storage cell and its subsequent path of travel for cutting a fuel storage cell free from the weldment structure of a fuel storage rack.
Figure 12:
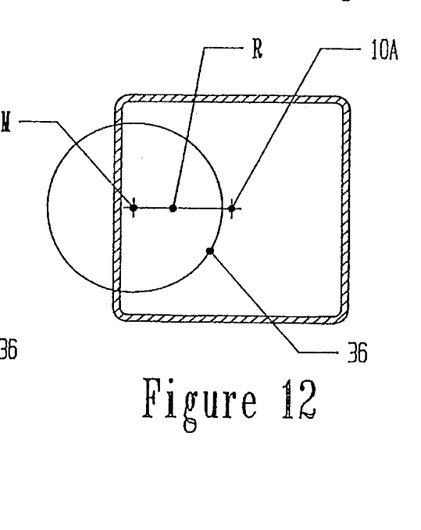
Figure 13:
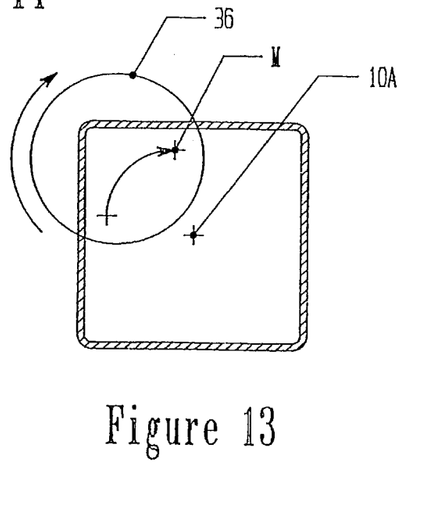
Figure 14:
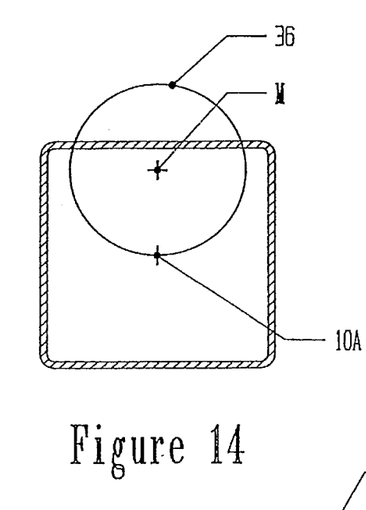

Returning to FIG. 7 the cutting apparatus 100 shown schematically is loaded into a selected one of the fuel storage cells and passed along the length thereof to a site where the cutter saw blade 36 can penetrate the side wall of the storage cell above the base by a short distance typically, for example, 3 or 4 inches. Thereafter, pneumatic pressure is delivered to the clamp assemblies 15–18 causing the pistons to extend from their respective cylinders and into forced engagement with the side wall of the fuel storage cell. The reaction force drives the walls 2 and 5 of housing 1 against the internal wall of the storage cell thus anchoring housing 1 against longitudinal movement within the storage cell. Power is then delivered to the drive motor 34 for a period of time sufficient to bring the rotational speed of the metal cutting saw blade 36 for a cutting operation where upon power is delivered to the linear actuator 30 which displaces mounting bracket 32 and the rotational axis of drive motor 34 in a direction for pressing the metal cutting saw blade against the interior of the storage cell as shown in FIG. 11. Power is continually delivered to the linear actuator 30 until the actuator reaches the end of its stroke, or abuts against an adjustable stop, whereupon the saw blade completes an initial puncture of the side wall and extends partially exteriorly of the storage cell wall as shown in FIG. 12. Thereafter, crank arm 12 is operated by a workman to rotate shaft 10 within housing 1. The rotational axis of 10A of shaft 10 generally coincides with the longitudinal central axis of the storage tube. However, because the rotational axis M of the motor and the saw blade driven thereby is displaced by the linear actuator from axis 10A, the rotation of crank arm 12 imparts a cutting path from the puncture site about an arc whose radius R corresponds to the distance between the rotational axis of a motor and axis 10A. In this fashion the cutter blade proceeds to cut the side wall through the storage cell side wall at a corner area as shown in FIG. 13 and then cutting proceeds with a transversing cut forming a parting line along an adjacent side wall of the storage cell as shown in FIG. 14. The cutting operation proceeds by the continue rotation of shaft 10 to perform the cutting operations along the remaining two side walls of the storage cell. This cutting operation frees an end of the storage cell from the base of the storage rack. A top portion of the storage cell section is freed from the band 55 by repeating the cutting operation as just described at a site adjacent the band whereupon a tube section of the storage cell is freed from the storage rack. The tube section is then subdivided by a crop saw into relatively short pieces which are then crushed and pressed as the processed as described herein before.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. A method for dismantling a storage rack used to store nuclear fuel assemblies, said storage rack including a base joined to an array of tubular or round storage cells having fuel entry ends which are opposite to said base for a fuel assembly, said method including the steps of:

pressing a metal cutting saw blade against an interior wall of a selected one of said storage cells at a site spaced from said base, moving said metal cutting saw blade in a direction outwardly from the interior of the tube to cause said saw blade to initially puncture and extend partly through said selected storage cell, and thereafter shifting said metal cutting saw blade about a cutting path from the puncture site within a storage cell generally transverse to the length of the storage cell to cut the remaining portion of the selected storage cell wall from said base.

2. The method according to claim 1 wherein said step of shifting said step of said cutting saw blade includes shifting the saw blade both laterally and transversely in the plane of movement by the saw blade from said puncture site.

3. The method according to claim 1 including the further step of supporting said storage rack on horizontal supports with the extended length of the tubular storage cells extending in a horizontal direction;

introducing said metal cutting saw blade horizontally along the selected one of said tubular storage cells;

anchoring said metal cutting saw against horizontal movement in the selected one of said tubular storage cells and thereafter performing said step of pressing a metal cutting saw blade against an interior wall.

4. The method according to claim 3 wherein said storage rack is placed on said horizontal supports within a contained area and filtering air circularly in the contained area in the HEPA filtration system to extract airborne particulates contaminated with low level radiation.

5. The method according to claim 1 wherein said step of shifting said cutting saw blade includes displacing the rotational axis of the metal cutting saw blade radially from the central axis of the selected storage cell and thereafter swinging the rotational axis of the saw blade about an arc whose center coincides with the pivot axis of a pivot shaft.

6. The method according to claim 1 including the further step of positioning said metal cutting saw blade at a site remotely to said puncture site at a selected storage cell near the fuel entry end thereof and again performing said step of pressing the metal cutting saw blade for severing a tubular storage wall section of the selected tubular storage cell free of support in said storage rack.

7. The method according claim 6 including the further step of reducing the volume of space by said tubular storage wall section.

8. The method according to claim 7 wherein the said step of reducing the volume includes crushing said tubular storage wall section between opposed dies by moving one die toward each other.

9. The method according to claim 7 wherein said step of reducing the volume includes sub-dividing said tubular storage wall sections to form a plurality of waste wall sections having a size and weight capable of manual manipulation by workman.

10. A method for dismantling a storage rack used to store nuclear fuel assemblies, said storage rack including a base joined to an array of tubular storage cells having fuel entry ends which are opposite to said base for a fuel assembly, said method including the steps of:

selecting a metal cutting saw having a cutter blade driven about an axis of rotation displaceable between an inoperative location and an operative location;

passing said metal cutting saw through the entry end of a selected tubular storage cell forming part of said storage rack to a site at a preselected space from said base;

energizing said metal cutting saw;

displacing said cutter blade from said inoperative location to an operative location causing said saw blade to cut into a wall segment of the selected storage cell; and orbiting the rotational axis of said cutter blade about a path within the confines of the selected tubular storage cell to sever the remaining portion of the wall section of the selected cell from said base.

11. Apparatus for dismantling racks used to store nuclear fuel assemblies, said storage rack including a base joined to an array of tubular storage cells having fuel entry ends which are opposite to said base for a fuel assembly, said apparatus including a combination of:

a support housing including means to rotatably support a drive shaft, said drive shaft having driven and drive shaft portions extending from opposite ends of said support housing;

means for anchoring said support housing within the tubular configuration of a selected one of said tubular storage cells;

a carrier supported by the driven shaft portion of said drive shaft;

a metal cutting saw including a cutter blade rotatably driven at one end of a motor housing;

means for supporting said motor housing on said carrier for displacement of the motor housing transverse to a rotational axis of said drive shaft for causing said saw blade to puncture a wall portion of such a tubular storage cell; and means for rotating the drive shaft for shifting said metal cutting saw blade from the puncture site about a storage cell cutting path generally transverse to the length of the storage cell to cut the remaining portion of the selected storage cell wall from said base.

12. The apparatus according to claim 11 the means for anchoring include piston and cylinder assemblies carried by said support housing to anchor the said support housing within a said selected one through said storage cells.

13. The apparatus according to claim 11 wherein said means for supporting includes a linear bearing and an actuator for displacing said metal cutting saw relative to said drive shaft.

14. The apparatus according to claim 13 wherein said means for supporting includes an L-shaped bracket supported by said drive shaft and supporting said linear bearing for defining a displacement distance between the rotational axis of said drive shaft and rotational axis of said metal cutting saw.

15. The apparatus according to claim 14 wherein said supporting housing has four sidewalls and wherein said means for anchoring said support housing comprises piston and cylinder assemblies arranged on adjacent ones of two sidewalls of said support housing for anchoring said housing between opposing sidewall of tubular storage cells having a square cross-section configuration.

* * * * *